(12) United States Patent
Jang et al.

(10) Patent No.: US 11,311,136 B2
(45) Date of Patent: Apr. 26, 2022

(54) ELECTRIC POT HAVING IMPROVED RELAY INSTALLATION POSITION

(71) Applicant: LG ELECTRONICS INC., Seoul (KR)

(72) Inventors: Ho Yong Jang, Seoul (KR); Donghyun Kim, Seoul (KR); Sehwa Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 388 days.

(21) Appl. No.: 16/704,178

(22) Filed: Dec. 5, 2019

(65) Prior Publication Data
US 2020/0187700 A1 Jun. 18, 2020

(30) Foreign Application Priority Data
Dec. 14, 2018 (KR) .................. 10-2018-0162478

(51) Int. Cl.
*A47J 27/21* (2006.01)
(52) U.S. Cl.
CPC ..... *A47J 27/2105* (2013.01); *A47J 27/21058* (2013.01)
(58) Field of Classification Search
CPC ................................ A47J 27/21166
See application file for complete search history.

(56) References Cited

U.S. PATENT DOCUMENTS

| 6,283,014 | B1* | 9/2001 | Ng | A47J 27/0802 |
| | | | | 99/332 |
| 8,344,290 | B1* | 1/2013 | Hinton | A45D 19/02 |
| | | | | 219/432 |
| 2012/0091117 | A1 | 4/2012 | Cheng | |
| 2013/0016462 | A1* | 1/2013 | Howitt | A47J 27/2105 |
| | | | | 361/679.01 |
| 2014/0263270 | A1* | 9/2014 | Garvey | A47J 27/21158 |
| | | | | 219/512 |
| 2016/0031596 | A1* | 2/2016 | Tuan | A47J 27/2105 |
| | | | | 219/438 |
| 2017/0331223 | A1* | 11/2017 | Cooper | H01R 13/6205 |
| 2018/0313576 | A1* | 11/2018 | Chen | H01R 33/94 |

FOREIGN PATENT DOCUMENTS

EP    1 858 297    11/2007

OTHER PUBLICATIONS

European Search Report dated Apr. 29, 2020 issued in EP Application No. 19214385.7.

\* cited by examiner

*Primary Examiner* — Nathaniel Herzfeld
(74) *Attorney, Agent, or Firm* — KED & Associates LLP

(57) ABSTRACT

An electric pot may have an improved relay installation position. The electric pot may include a supporter and a pot main body provided with a heater driven to provide heat through an electric connection with connection terminals. The supporter may include a relay part that optionally switches between a connection of the power supply to a third connection terminal and a disconnection of the power supply to the third connection terminal.

20 Claims, 10 Drawing Sheets

ELECTRIC POT HAVING IMPROVED RELAY INSTALLATION POSITION

CROSS-REFERENCE TO RELATED APPLICATION

This application claims priority to and the benefit of Korean Patent Application No. 10-2018-0162478, filed in Korea on Dec. 14, 2018, the disclosure of which is incorporated herein by reference in its entirety.

BACKGROUND

1. Field

The present disclosure relates to an electric pot having an improved relay installation position.

2. Background

In general, an electric pot is an apparatus that may boil fluids such as water and that may keep the fluids warm. The electric pot is also an apparatus that may boil water more readily than a gas stove. Accordingly, the pot may be used to boil water for coffee or tea. Additionally, the electric pot may be used for various purposes. For example, the electric pot may be used to cook ramyeon noodles, to heat soup, stew, and the like, to steam food, and the like.

FIG. 1 is a cross-sectional view illustrating an electric pot of the related art. FIG. 2 is a block diagram illustrating a configuration with which the electric pot in FIG. 1 is provided.

FIGS. 1 and 2 are drawings disclosed in U.S. Patent Publication No. 2012-0091117 AI, the subject matter of which is incorporated herein by reference, and reference numerals used in FIGS. 1 and 2 are limited only to FIGS. 1 and 2.

Referring to FIGS. 1 and 2, the electric pot of the related art includes a base 1 and a body 2 that are detachably coupled to each other. The base 1 is provided with a first power substrate 11, a relay 12, a first infrared IC module 13, an infrared receiver 14, and the like. The body 2 is provided with a second power substrate 21, a second infrared IC module 22, an infrared transmitter 23, a thermistor 25, a heater 27, and the like.

The base 1 and the body 2 are detachably coupled by a seated connection 16, 28 and are electrically connected. In the electric pot of the related art, the relay 12 is provided in the base 1. Accordingly, in order for the relay 12 to be driven, temperature information sensed by the thermistor 25 of the body 2 is transmitted to the base 1. Additionally, in order for the temperature information to be transmitted with a wireless communication method, the infrared transmitter 23 is installed at a lower portion of the body 2, and the infrared receiver 14 is installed in the base 1.

When the wireless communication method is applied to an electric pot, a transmitter and a receiver, and a micom (i.e., a micro-computer) for processing communication data, and the like are installed in the base 1 and the body 2, thereby increasing manufacturing costs.

Additionally, temperature of the lower portion of the body 2 may be increased by the heater 27, and, accordingly, communication performance of the infrared transmitter 23 installed at the lower portion of the body 2 may be deteriorated.

When a foreign substance is introduced into the base 1 or the body 2, communication signals of the infrared receiver 14 and the infrared transmitter 23 may be distorted.

FIG. 3 is a schematic view illustrating an electric port of the related art to which a 4-terminal-type power module is applied. FIG. 4 is a schematic view illustrating an electric port of the related art to which a 6-terminal-type power module is applied.

The electric pot of the related art, as illustrated in FIG. 3, includes a supporter 100 (corresponding to the base in FIG. 1) and a pot main body 200 (corresponding to the body in FIG. 1) that are detachably coupled to each other. Unlike the electric pot in FIG. 1, the electric pot in FIG. 3 includes the pot main body 200 in which a controller 210 and a relay (RL1, and RL2) are installed.

When the controller 210 is installed in the pot main body 200, a 4-terminal-type power module (PM1, and PM2) is used for the supporter 100 and the pot main body 200, and the relay (RL1, and RL2) is installed at a lower portion of the pot main body 200.

A user may lift the pot main body 200 not the supporter 100 and pours boiled water into a cup or a container. Accordingly, the relay (RL1, and RL2) installed at the lower portion of the pot main body 200 of the electric pot may be damaged because the pot main body 200 is frequently moved.

When the relay (RL1, and RL2) is installed in the supporter 100 that is moved less frequently than the pot main body 200, the possibility of damage to the relay (RL1, and RL2) may be minimized. However, when the relay is to be installed in the supporter, a 6-terminal-type power module (PM1), as illustrated in FIG. 4, is applied to the supporter 100. When the 6-terminal-type power module (PM1) is applied to the supporter 100, a product (an electric pot) has an increased diameter in itself, thereby making it difficult to satisfy a product standard.

BRIEF DESCRIPTION OF THE DRAWINGS

Embodiments will be described in detail with reference to the following drawings in which like reference numerals refer to like elements, and wherein.

DETAILED DESCRIPTION

Figure 1:
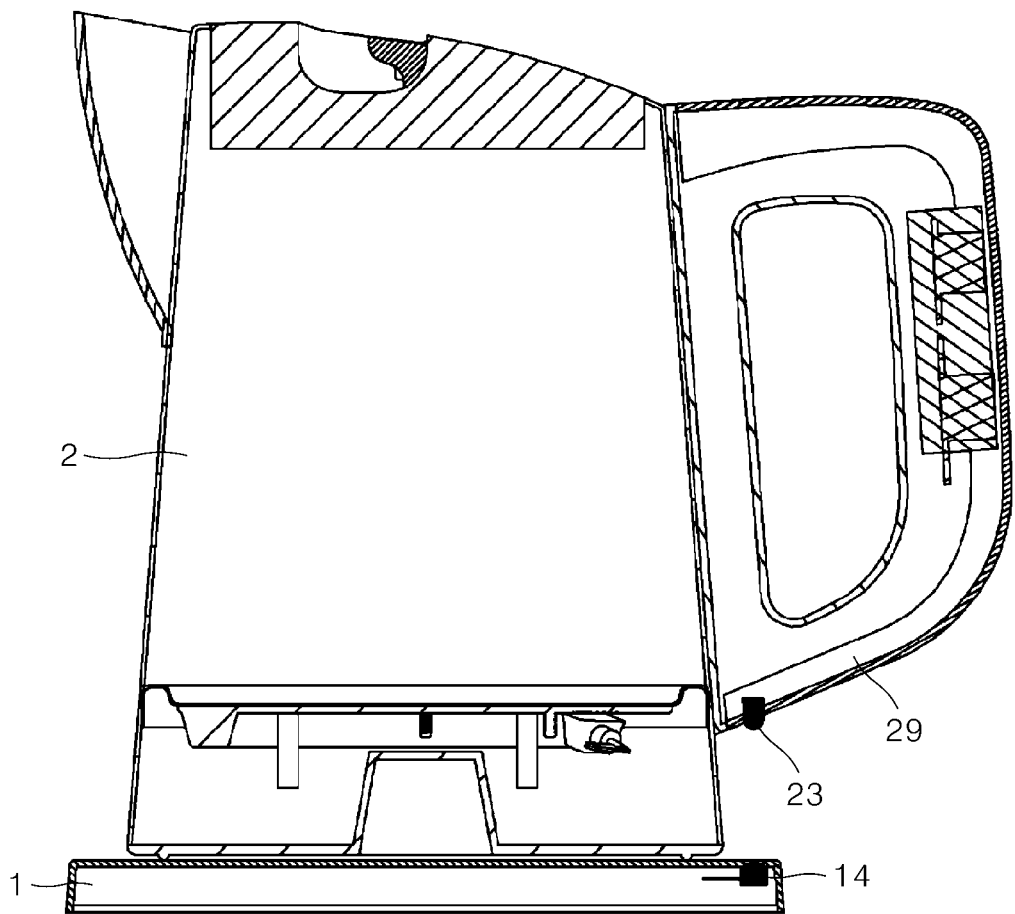
FIG. 1 is a cross-sectional view illustrating an electric pot of the related art.
Figure 2:
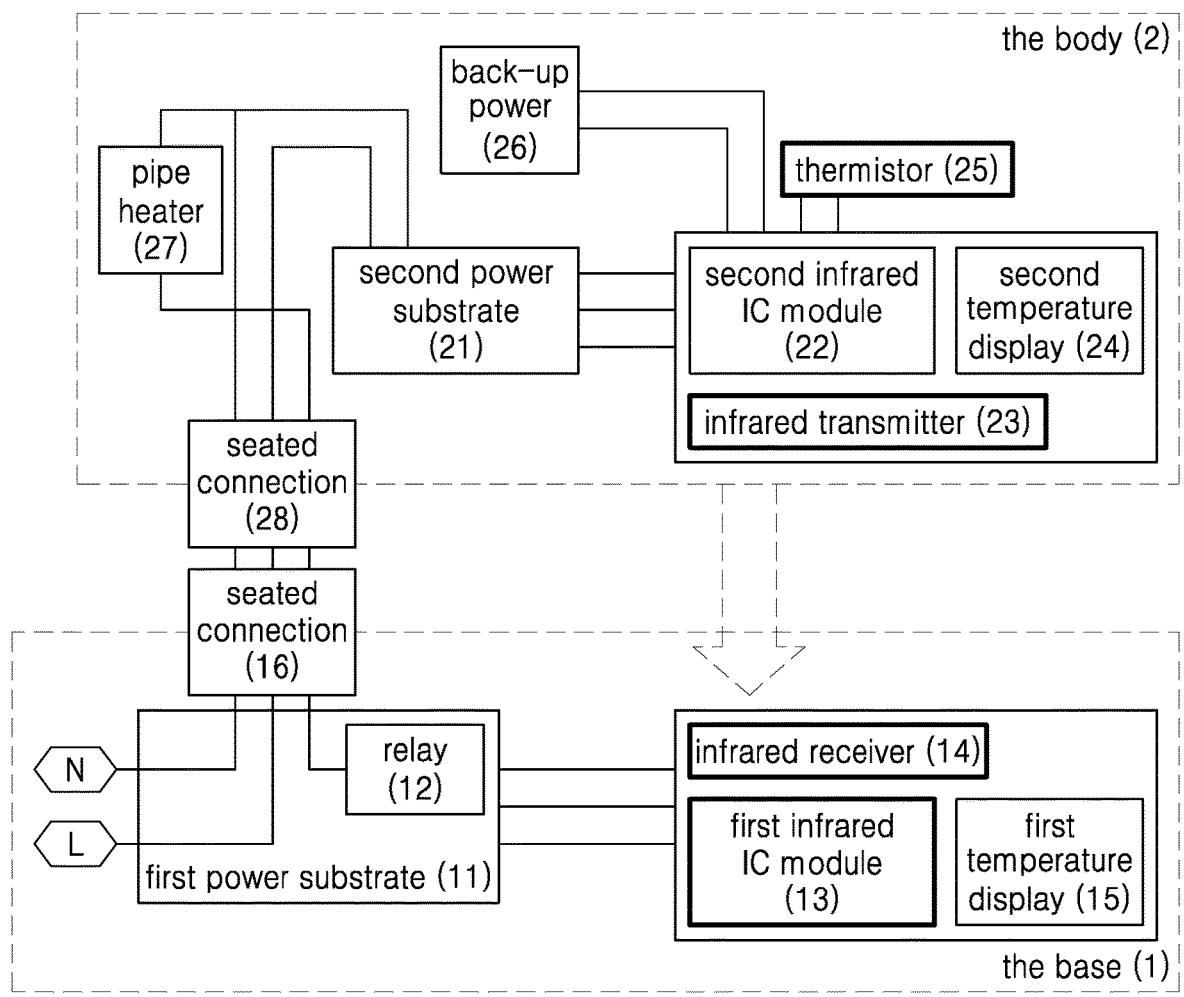
FIG. 2 is a block diagram illustrating a configuration with which the electric pot in FIG. 1 is provided.
Figure 3:
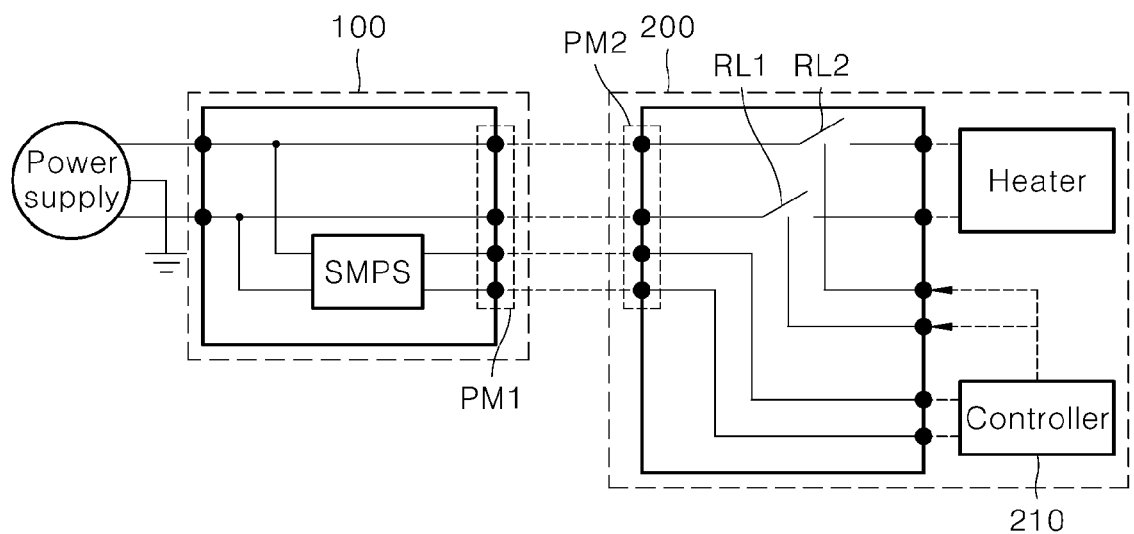
FIG. 3 is a schematic view illustrating an electric port of the related art to which a 4-terminal-type power module is applied.
Figure 4:
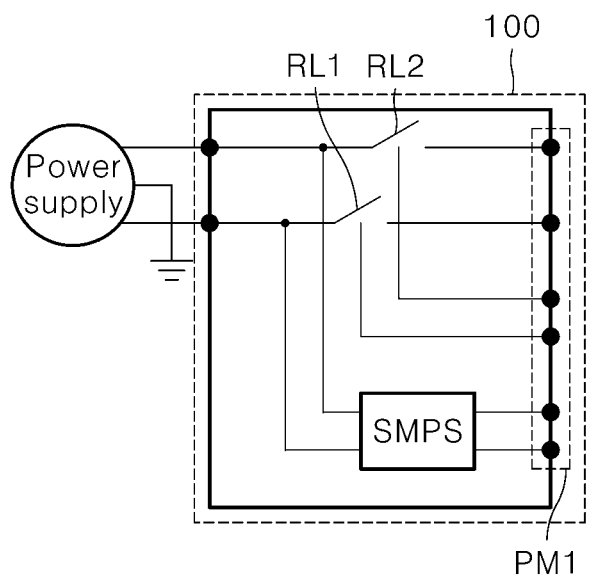
FIG. 4 is a schematic view illustrating an electric port of the related art to which a 6-terminal-type power module is applied.
Figure 5:
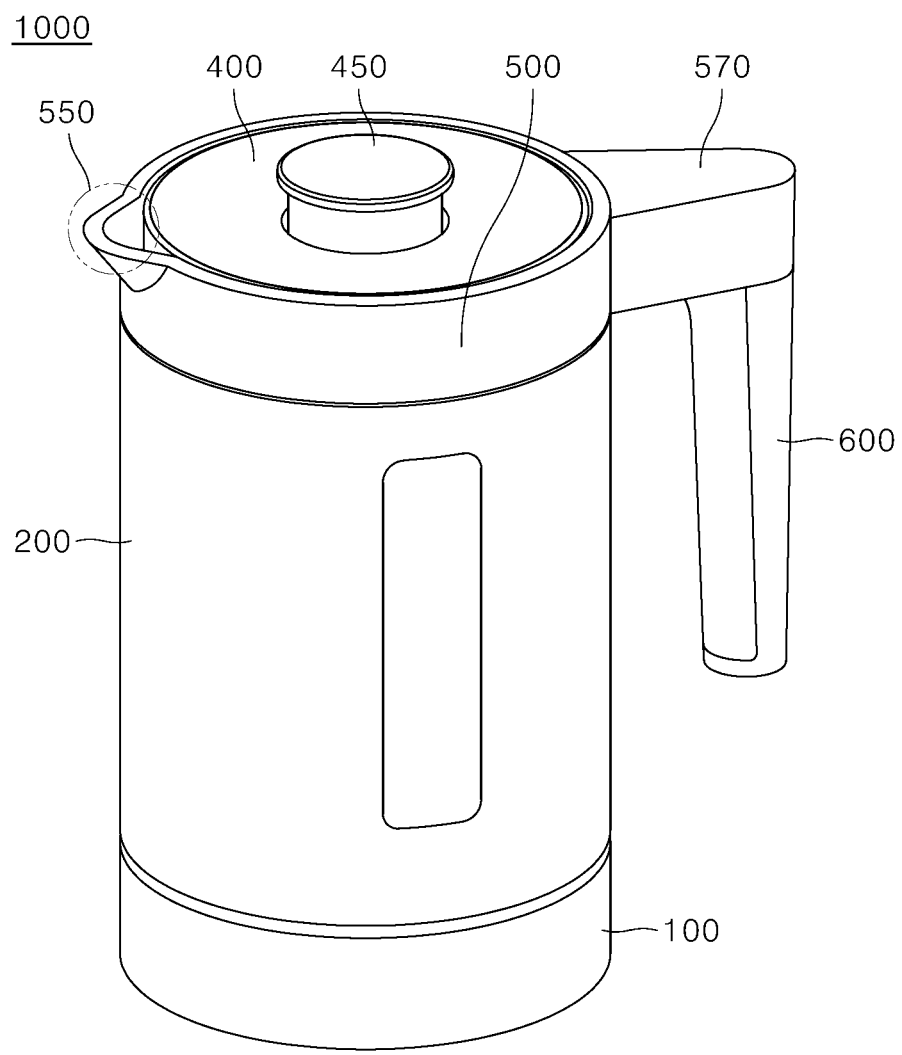
FIG. 5 is a perspective view illustrating an exemplary electric pot.
Figure 6:
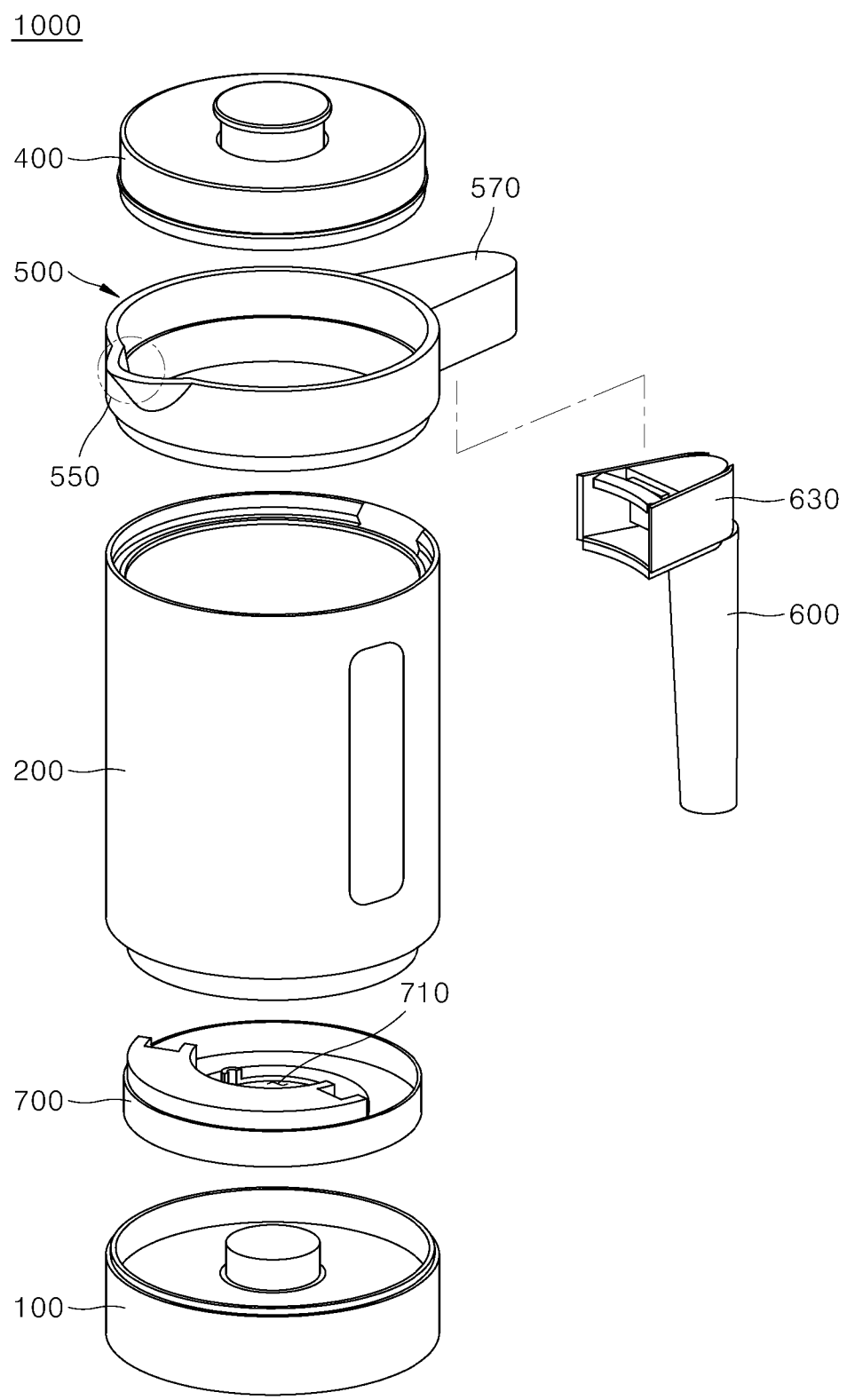
FIG. 6 is an exploded perspective view illustrating the electric pot in FIG. 5.
Figure 7:
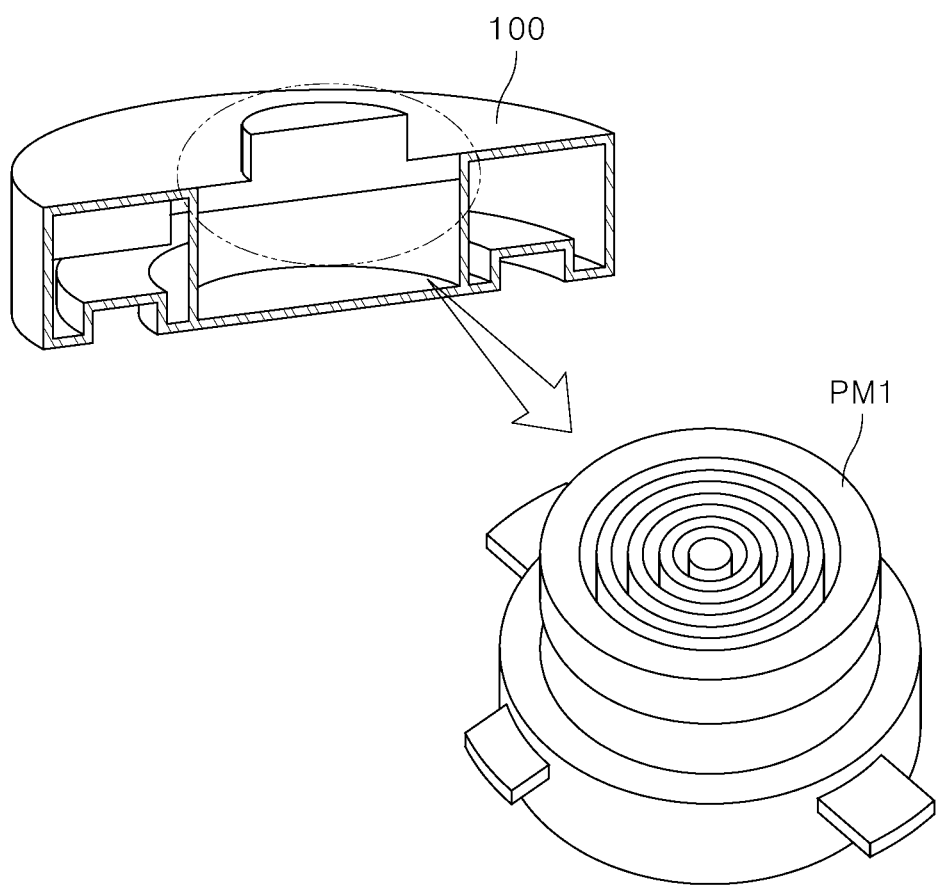
FIG. 7 is a cross-sectional view illustrating the supporter in FIG. 5.
Figure 8:
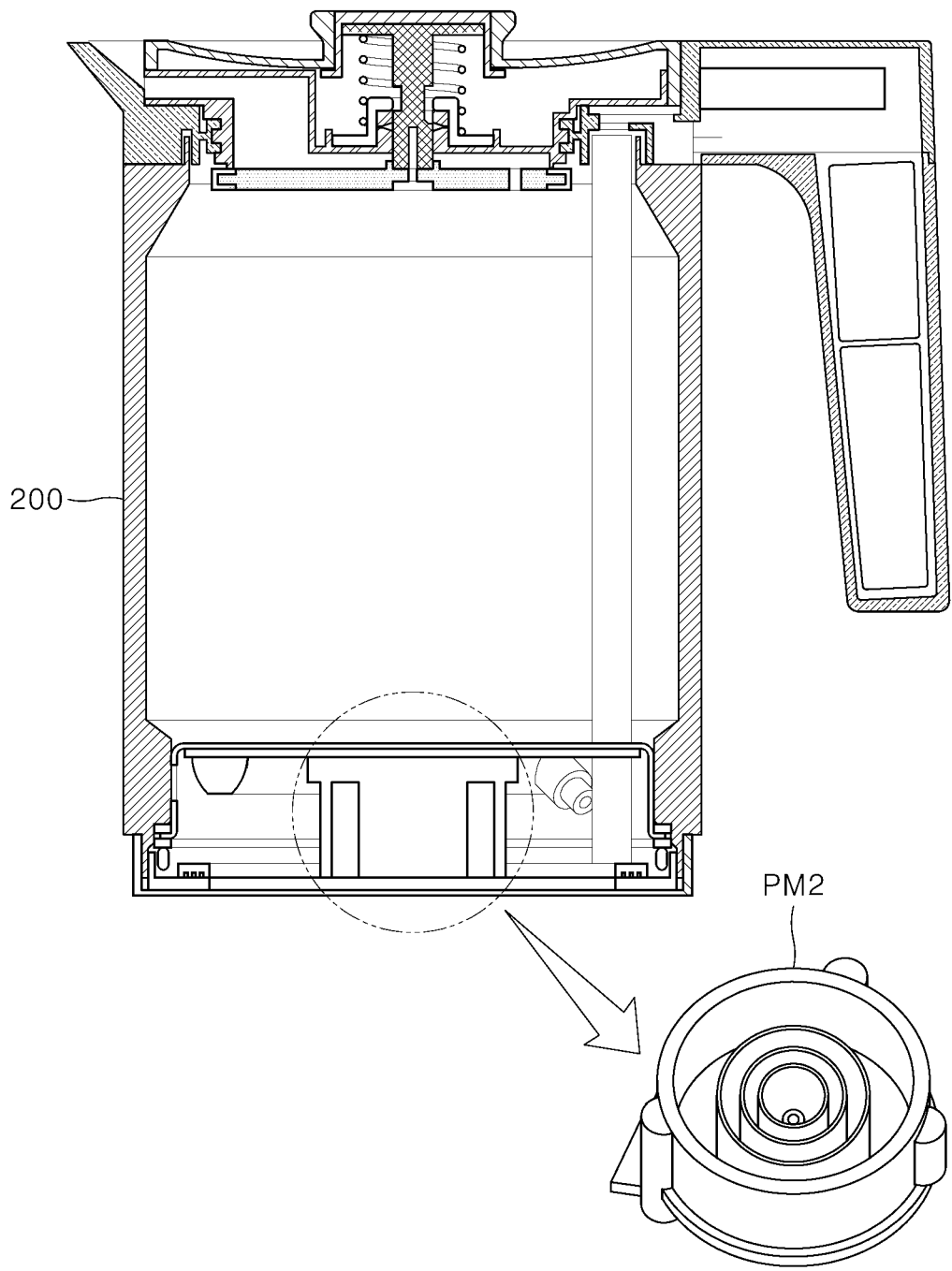
FIG. 8 is a cross-sectional view illustrating the pot main body in FIG. 5.

FIG. 5 is a perspective view illustrating an exemplary electric pot. FIG. 6 is an exploded perspective view illustrating the electric pot in FIG. 5. FIG. 7 is a cross-sectional view illustrating the supporter in FIG. 5. FIG. 8 is a cross-sectional view illustrating the pot main body in FIG. 5.

Referring to FIGS. 5 to 8, an exemplary electric pot 1000 may include a supporter 100, a pot main body 200, a lid 400, a pot-main-body-upper-end coupler 500, a handle 600, a pot-main-body-lower-end coupler 700.

The supporter 100 may be detachably coupled to a lower end of the pot main body 200. Specifically, the supporter 100 may be coupled to the lower end of the pot main body 200 and may support the pot main body 200. Additionally, the supporter 100 includes a power supply cable that is connected with an external power supply (i.e., a power supply 300 in FIG. 9), and, accordingly, may receive electric power from the external power supply and may supply the electric power to the pot main body 200.

As illustrated in FIG. 7, the supporter 100 is provided with a first power module (PM1) that protrudes upwards from an upper end of the supporter 100. Specifically, the first power module (PM1) may have a cylindrical shape that protrudes upwards from a central portion of the upper end of the supporter 100. Additionally, the first power module (PM1) is electrically connected with a second power module (PM2) through a male-female coupling with the second power module (PM2) included in the pot main body 200, and, through the electric connection, the supporter 100 may transmit electric power received from the external power supply to the pot main body 200. The first power module (PM1) may be male-female coupled to the second power module (PM2), and may also be electrically connected to a heater (220 in FIG. 9) of the pot main body 200 (that is, when first, second, and fourth connection terminals (CP1, CP2, and CP4) are electrically connected respectively to fifth to seventh connection terminals (CP5, CP6, and CP7), third and fourth connection terminals (CP3, and CP4) may be electrically connected to the heater (220 in FIG. 9)). That is, the supporter 100 and the pot main body 200 may be coupled through a male-female coupling between the first and second power modules (PM1, and PM2).

The pot main body 200 may be detachably coupled to the upper end of the supporter 100, and may contain contents (e.g., water, or drinks and the like) inside the pot main body 200. Specifically, the pot main body 200 has a space that may accommodate contents (e.g., water or drinks and the like) inside the pot main body 200 and is provided with a heater (220 in FIG. 9) that heats the contents.

The upper end of the pot main body 200 may be opened. Accordingly, the pot-main-body-upper-end coupler 500 may be coupled to the opened upper end of the pot main body 200. A user may put contents into the pot main body 200 through the opened upper end of the pot main body 200.

The pot main body 200 may include a thermal insulation material and a material that reduces heat transfer to allow contents to maintain their temperature levels. The pot main body 200 may have a cylindrical shape but not be limited.

The pot main body 200, as illustrated in FIG. 8, may be provided with the second power module (PM2) male-female coupled to the first power module (PM1), at the lower end of the pot main body 200. The second power module (PM2) may be electrically connected with the first power module (PM1) through the male-female coupling with the first power module (PM1) included in the supporter 100, and, through the electric connection, the pot main body 200 may receive electric power from the supporter 100.

The lid 400 may be detachably coupled to an upper end of the pot-main-body-upper-end coupler 500. Specifically, the lid 400 may be coupled to the upper end of the pot-main-body-upper-end coupler 500 and may cover the opened upper end of the pot main body 200. Additionally, the lid 400 may be coupled to the pot-main-body-upper-end coupler 500 and may allow contents contained in the pot main body 200 to be discharged only through an outlet 550 of the pot-main-body-upper-end coupler 500. The lid 400 is provided with a knob 450, protruding upwards, on an upper surface of the lid 400. Accordingly, the user may attach the lid 400 to and detach the lid 400 from the pot-main-body-upper-end coupler 500 using the knob 450.

The pot-main-body-upper-end coupler 500 may be coupled between the upper end of the pot main body 200 and the lower end of the lid 400.

Specifically, the pot-main-body-upper-end coupler 500 may be coupled between the pot main body 200 and the lid 400, and upper and lower ends of the pot-main-body-upper-end coupler 500 may all be opened. Accordingly, the user may put contents into the pot main body 200 through the pot-main-body-upper-end coupler 500 the upper and lower ends of which are opened after lifting the lid 400. Further, the pot-main-body-upper-end coupler 500 includes the outlet 550 at one side of the upper end of the pot-main-body-upper-end coupler 500. Accordingly, the contents contained in the pot main body 200 may be discharged outwards through the outlet 550 based on a degree to which the user tilts the pot main body 200, even in a state in which the lid 400 is coupled to the pot-main-body-upper-end coupler 500. The outlet 550 may communicate with an inner space of the pot main body 200 to discharge the contents in the pot main body 200 outwards.

The pot-main-body-upper-end coupler 500 may be provided with a handle coupler 570 on one lateral surface of the pot-main-body-upper-end coupler 500, and the handle 600 may be inserted into and coupled to the handle coupler 570.

The handle 600 may be inserted into and coupled to the handle coupler 570, and may have a pillar shape that is readily gripped in the hand of the user. Additionally, the handle 600 may be provided with a touch substrate to which a metal touch sensor (e.g., a piezo disc) is attached, various parts and components (e.g., a below-described controller (635 in FIG. 9)) regarding driving and controlling of the electric pot 1000, and the like, inside an upper portion 630 (i.e., a portion inserted into and coupled to the handle coupler 570) of the handle 600, but not be limited.

The pot-main-body-lower-end coupler 700 may be coupled between a lower end of the pot main body 200 and an upper end of the supporter 100. Specifically, the pot-main-body-lower-end coupler 700 may be coupled between the pot main body 200 and the supporter 100. Additionally, the pot-main-body-lower-end coupler 700 may include an insertion hole 710 at a central portion of the pot-main-body-lower-end coupler 700, and the first power module (PM1) of the supporter 100 may be inserted into and coupled to the insertion hole 710.

Figure 9:
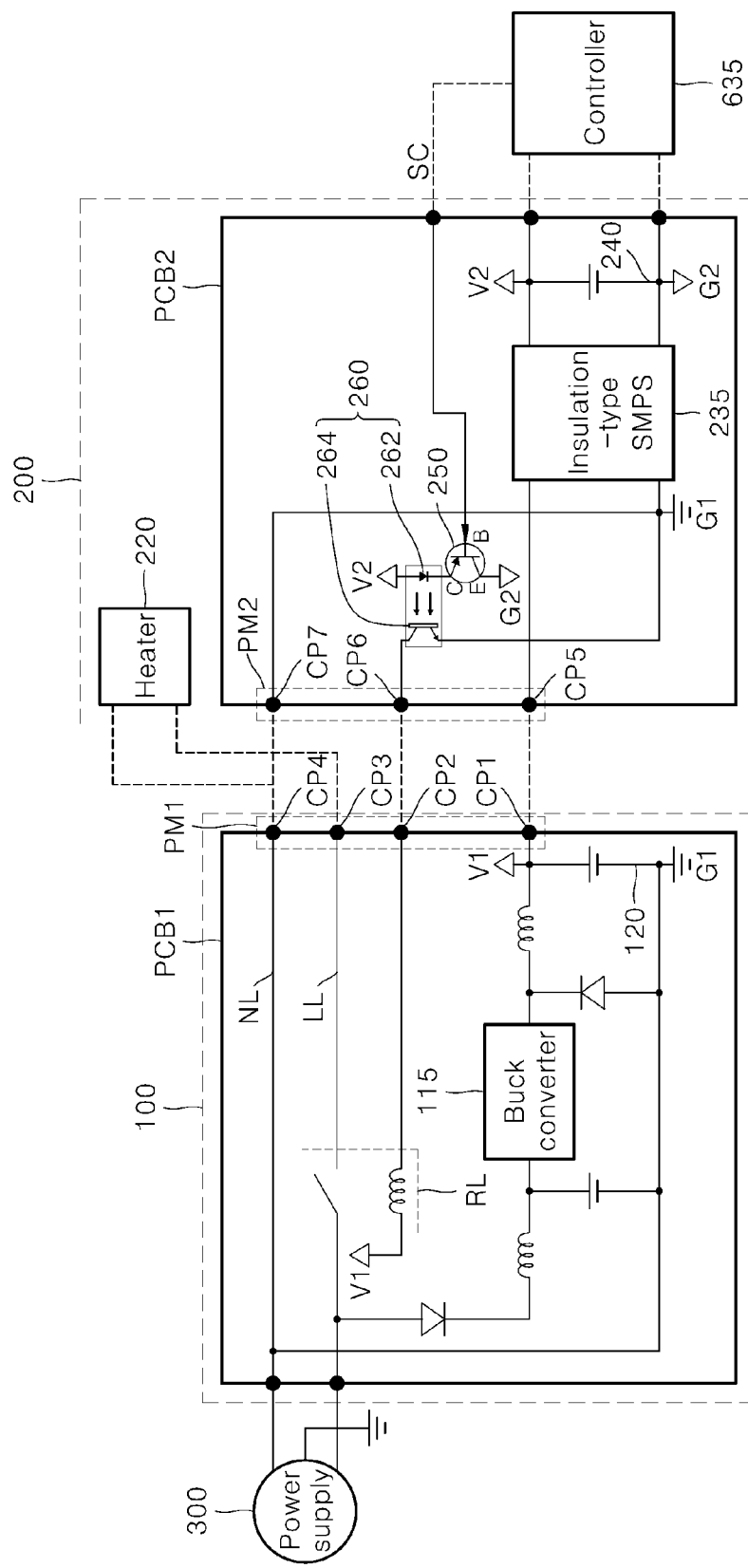
FIG. 9 is a schematic view illustrating an example of a relay control structure of the electric pot in FIG. 5.
Figure 10:
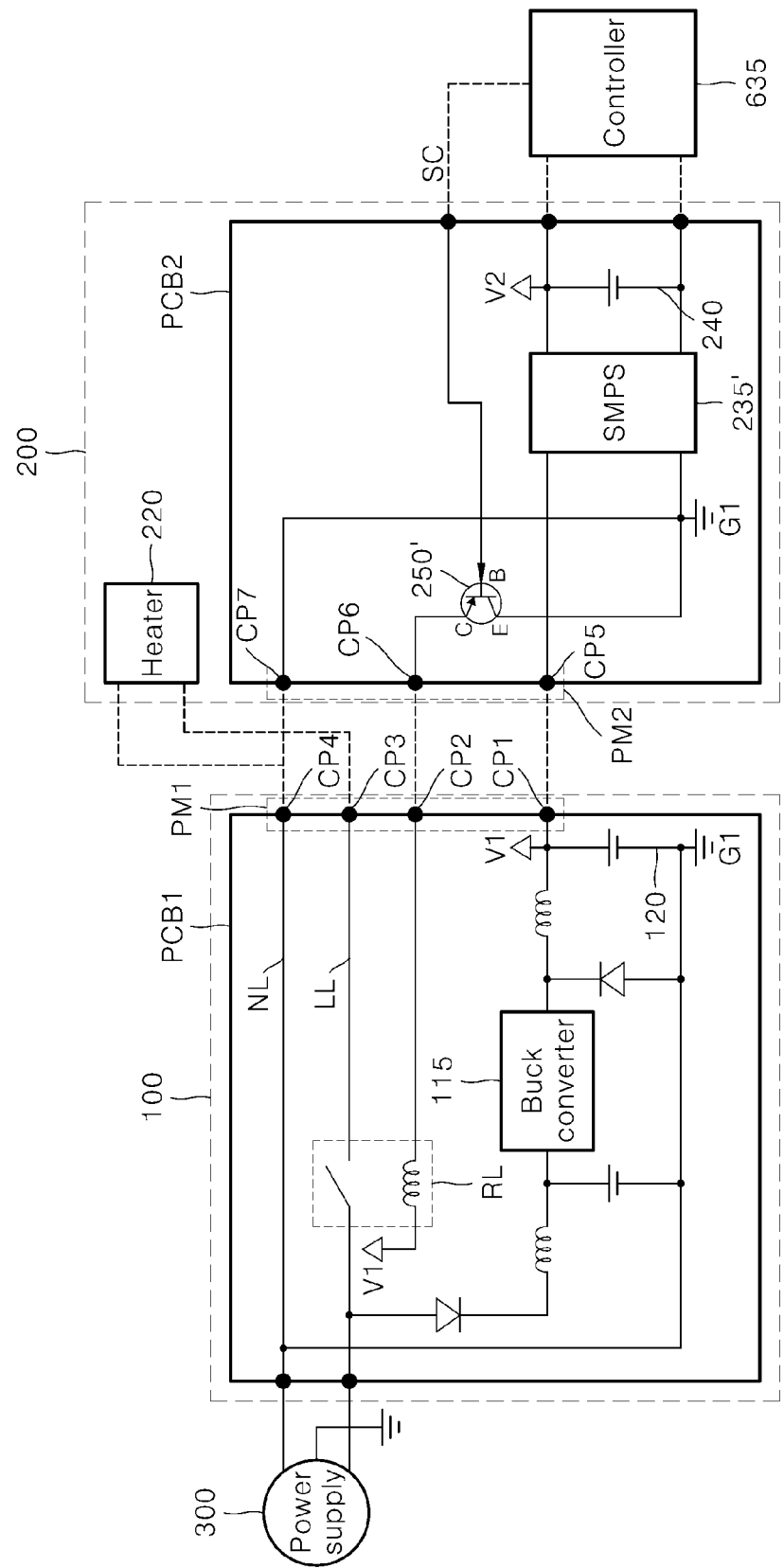
FIG. 10 is a schematic view illustrating another example of a relay control structure of the electric pot in FIG. 5.

FIG. 9 is a schematic view illustrating an example of a relay control structure of the electric pot in FIG. 5. FIG. 10 is a schematic view illustrating another example of a relay control structure of the electric pot in FIG. 5.

FIG. 9 shows an example in which an insulation structure is required because a metal touch sensor is provided inside the upper portion 630 of the handle. FIG. 10 is an example in which no insulation structure is required because a metal touch sensor is not provided inside the upper portion 630 of the handle. Referring to FIG. 9, the supporter 100 may be electrically connected with the pot main body 200 through a male-female coupling, and may transmit electric power, received from the power supply 300, to the pot main body 200.

In FIG. 9, the power supply 300 is illustrated as being outside of the supporter 100, but may be implemented in the form of a battery and the like inside the supporter 100. For convenience of description, the power supply 300 placed outside of the supporter 100 and connected with the supporter 100 through a power supply cable is provided as an example.

The supporter 100 may include a first power module (PM1), a relay (RL), a buck converter 115, a first voltage regulator 120. The relay RL may also be called a relay circuit or a relay device.

The first power module (PM1) may be a 4-terminal-type power module including first to fourth connection terminals (CP1 to CP4), and may be male-female coupled to a second power module (PM2). When the first and second power modules (PM1, and PM2) are male-female coupled, the first connection terminal (CP1) of the first power module (PM1) may be electrically connected to a fifth connection terminal (CP5) of the second power module (PM2), and, through the electric connection, the first power module (PM1) may supply electric power to the second power module (PM2).

When the first and second power modules (PM1, and PM2) are male-female coupled, the third and fourth connection terminals (CP3, and CP4) of the first power module (PM1) may be electrically coupled to a heater 220, and, through the electric connection, the first power module (PM1) may supply electric power to the heater 220.

When the first and second power modules (PM1, and PM2) are male-female coupled, the second connection terminal (CP2) of the first power module (PM1) may be electrically connected to a sixth connection terminal (CP6) of the second power module (PM2), and, through the electric connection, the relay (RL) may be switched over based on operations of a below-described photocoupler 260. Further, when the first and second power modules (PM1, and PM2) are male-female coupled, the fourth connection terminal (CP4) of the first power module (PM1) may be electrically connected to a seventh connection terminal (CP7) of the second power module (PM2), and, through the electric connection, the first voltage regulator 120 and the fourth connection terminal (CP4) may be commonly connected to the first ground (G1).

The relay (RL) may optionally switch over a connection between the power supply 300 and the third connection terminal (CP3), and may be connected to the second connection terminal (CP2) electrically connected with the sixth connection terminal (CP6). The switchover operation of the relay (RL) may be controlled by the photocoupler 260. The relay (or relay circuit) may selectively switch between a connection of the power supply to the third connection terminal and a disconnection of the power supply to the third connection terminal.

A neutral line (NL) of the power supply 300 may be connected to the fourth connection terminal (CP4), and a live line (LL) of the power supply 300 may be connected to the third connection terminal (CP3). Accordingly, the relay (RL) may switch over the live line (LL).

The relay (RL) may include two or more relays. In the embodiment, the relay (RL) including a single relay is provided as an example.

The buck converter 115 may receive alternating current power from the power supply 300 and may convert magnitude of a voltage of the received alternating current power. Specifically, the buck converter 115 may be connected to the live line (LL) of the power supply 300, may reduce a voltage of the alternating current power received from the power supply 300, and may transmit the reduced voltage to the first voltage regulator 120. That is, the buck converter 115 may reduce magnitude of a voltage of the alternating current power received from the power supply 300, and may transmit the reduced voltage to the first voltage regulator 120. One end of the buck converter 115 may be connected to the live line (LL), and the other end of the buck converter 115 may be connected to the first voltage regulator 120.

The first voltage regulator 120 may control magnitude of the voltage converted by the buck converter 115 to a predetermined first voltage (V1). That is, the first voltage regulator 120 may control a voltage value of alternating current power received from the buck converter 115 to a voltage value corresponding to the predetermined first voltage (V1). The alternating current power reduced by the buck converter 115 and transmitted to the first voltage regulator 120 may be transmitted to the fifth connection terminal (CP5) of the second power module (PM2) through the first connection terminal (CP1) of the first power module (PM1).

The above-described relay (RL), the buck converter 115, and the first voltage regulator 120 may be mounted on a first printed circuit board (PCB1) provided in the supporter 100, but is not limited to this example.

That is, the relay (RL), the buck converter 115, the first voltage regulator 120 may be distributed and mounted respectively onto an additional printed circuit board. In the embodiment of the disclosure, the above-described relay (RL), the buck converter 115, and the first voltage regulator 120 mounted on the first printed circuit board (PCB1) are provided as an example.

The pot main body 200 may be electrically connected with the supporter 100 through a male-female coupling and may receive electric power from the supporter 100.

Additionally, the pot main body 200 may include a second power module (PM2), a heater 220, an insulation-type SMPS (switched-mode power supply) 235, a second voltage regulator 240, a switch 250, and a photocoupler 260. Specifically, the second power module (PM2) may be a three-terminal-type power module including fifth to seventh connection terminals (CP5, CP6, and CP7), and may be male-female coupled to the first power module (PM1).

When the first and second power modules (PM1, and PM2) are male-female coupled, the heater 220 may be electrically connected with the third and fourth connection terminals (CP3, and CP4). That is, the heater 220 may be driven to provide heat through its electric connection with the third and fourth connection terminals (CP3, and CP4).

The insulation-type SMPS 235 may be connected to the fifth connection terminal (CP5) and may rectify electric power supplied to the second power module (PM2). Specifically, the insulation-type SMPS 235 receives alternating current power from the second power module (PM2), may rectify the received alternating current power into direct current power, and may transmit the direct current power to the second voltage regulator 240.

The insulation-type SMPS 235 has insulation properties. Accordingly, the seventh connection terminal (CP7) and a light-receiving element 264 of the below-described photocoupler 260 may be connected to the first ground (G1), and the second voltage regulator 240 may be connected to a second ground (G2) different from the first ground (G1). As one example, the second ground may be provided for a different circuit board than the first ground.

The insulation-type SMPS 235 may serve as an insulation structure for the metal touch sensor provided inside the upper portion (630 in FIG. 6) of the above-described handle.

The second voltage regulator 240 may control magnitude of a voltage of electric power rectified by the insulation-type SMPS 235 to a predetermined second voltage (V2). That is, the second voltage regulator 240 may control a voltage value of the direct current power received from the insulation-type SMPS 235 to a voltage value corresponding to the predetermined second voltage (V2). Additionally, the second voltage regulator 240 may be connected to the second ground (G2) not to the first ground (G1) because of insulation properties of the insulation-type SMPS 235.

A voltage value (e.g., 5V) of the predetermined second voltage (V2) may be smaller than a voltage value (e.g., 12V) of the predetermined first voltage (V1).

Operations of the switch 250 may be controlled by the below-described controller 635, and may be connected to the second ground (G2). The switch 250 may selectively change between a first state (i.e., turn on) and a second state (i.e., turn off) based on a signal from the controller 635.

Specifically, a collector (C) of the switch 250 may be connected to the photocoupler 260 (i.e., a light-emitting element 262), and an emitter (E) of the switch 250 may be connected to the second ground (G2). The switch 250 may be turned on (first state) or turned off (second state) based on a switch-control signal (SC) received from the controller 635.

The photocoupler 260 may control an electric connection between the sixth connection terminal (CP6) and the first ground (G1) based on operations of the switch 250. Specifically, when the switch 250 is turned on, the photocoupler 260 may electrically connect the sixth connection terminal (CP6) and the first ground (G1), and when the switch 250 is turned off, the photocoupler 260 may block (or prevent) the electric connection between the sixth connection terminal (CP6) and the first ground (G1).

The photocoupler 260 may include a light-emitting element 262 (i.e., an input side element) connected to the switch 250, and a light-receiving element 264 (i.e., an output side element) connected between the sixth connection terminal (CP6) and the first ground (G1). The light-emitting element 262 may transmit a light-receiving-element-control signal to the light-receiving element 264 based on operations of the switch 250. That is, when the light-emitting element 262 supplies a light-receiving-element-turning-on signal to the light-receiving element 264, the sixth connection terminal (CP6) and the first ground (G1) may be electrically connected while the light-receiving element 264 is turned on.

When the light-emitting element 262 supplies a light-receiving-element-turning-off signal to the light-receiving element 264, the electric connection between the sixth connection terminal (CP6) and the first ground (G1) may be blocked (or prevented) while the light-receiving element 264 is turned off.

The light-emitting element 262 and the light-receiving element 264 are electrically insulated. Accordingly, the light-receiving-element-control signal may be transmitted to the light-receiving element 264 from the light-emitting element 262 using light as a medium.

The light-emitting element 262, for example, may include a light-emitting diode, and the light-receiving element 264, for example, may include a phototransistor, but not be limited.

The controller 635 may receive electric power from the pot main body 200 to operate. That is, the controller 635 may be provided inside the upper portion (630 in FIG. 6) of the above-described handle, may operate based on a voltage received from the second voltage regulator 240, and may control operations of the switch 250.

More specifically, when receiving a product-driving signal from an input part (or input device), the controller 635 may supply a switch-control signal (SC) to a base (B) of the switch 250 based on the received product-driving signal. When the switch 250 is turned on by the switch-control signal (SC), the photocoupler 260 may electrically connect the sixth connection terminal (CP6) and the first ground (G1).

When receiving a product-driving-stop signal from the input part, the controller 635 may provide a switch-control signal (SC) to the base (B) of the switch 250 based on the received product-driving-stop signal. When the switch 250 is turned off by the switch-control signal (SC), the photocoupler 260 may block the electric connection between the sixth connection terminal (CP6) and the first ground (G1).

The input part may be implemented at the above-described handle (600 in FIG. 5) or the above-described handle coupler (570 in FIG. 5) and the like in association with the above-described metal touch sensor, but is not limited to this example. That is, the input part may also be implemented on an outer surface of the pot main body 200 or the supporter 100. The controller 635 may also be provided in the pot main body 200, and not at the upper portion (630 in FIG. 6) of the handle. In FIG. 9, the input part implemented at the handle (600 in FIG. 5) or the handle coupler (570 in FIG. 5) and the like, and the controller 635 provided at the upper portion (630 in FIG. 6) of the handle are provided as an example for ease of description.

The insulation-type SMPS 235, the second voltage regulator 240, the switch 250 and the photocoupler 260 may be mounted on a second printed circuit board (PCB2) provided in the pot main body 200 (i.e., an inner lower portion of the pot main body 200), but not be limited.

The above-described insulation-type SMPS 235, the second voltage regulator 240, the switch 250 and the photocoupler 260 may be distributed and mounted respectively onto an additional printed circuit board. In FIG. 9, the above-described insulation-type SMPS 235, the second voltage regulator 240, the switch 250 and the photocoupler 260 mounted on the second printed circuit board (PCB2) are provided as an example.

The supporter 100 and the pot main body 200 may be configured, and the controller 635 is driven, as described above. A relay control method of the electric pot is described based on the above description.

Specifically, when the controller 635 turns on the switch 250 in a state in which the first power module (PM1) and the second power module (PM2) are electrically connected, the photocoupler 260 may electrically connect the sixth connection terminal (CP6) and the first ground (G1). When the photocoupler 260 electrically connects the sixth connection terminal (CP6) and the first ground (G1), electric currents may flow along a path (i.e., a path to which the predetermined first voltage (V1) is supplied) to the relay (RL), the second connection terminal (CP2), the sixth connection terminal (CP6), the light-receiving element 264, and the first ground (G1), and, accordingly, the relay (RL) may be switched over in a direction in which the power supply 300 and the third connection terminal (CP3) are connected.

The relay (RL) is switched over as described above. Accordingly, the power supply 300 and the third connection terminal (CP3) may be connected. In this example, electric power of the power supply 300 may be supplied to the heater 220, and the heater 220 may operate.

When the controller 635 turns off the switch 250 in a state in which the first power module (PM1) and the second power module (PM2) are electrically connected, the photocoupler 260 may block an electric connection between the sixth connection terminal (CP6) and the first ground (G1). When the photocoupler 260 blocks the electric connection between the sixth connection terminal (CP6) and the first ground (G1), electric currents may not flow along a path to the relay (RL), the second connection terminal (CP2), the sixth connection terminal (CP6), the light-receiving element 264, and the first ground (G1), and, accordingly, the relay (RL) may be switched over in a direction in which a connection between the power supply 300 and the third connection terminal (CP3) are blocked.

The relay (RL) may be switched over as described above. Accordingly, the connection between the power supply 300 and the third connection terminal (CP3) may be blocked.

Electric power of the power supply 300 may not be supplied to the heater 220, and the heater 220 may not operate.

When the first power module (PM1) and the second power module (PM2) are electrically connected, the first voltage regulator 120 may supply alternating current power to the fifth connection terminal (CP5) through the first connection terminal (CP1), and the insulation-type SMPS 235 may rectify the alternating current power supplied to the fifth connection terminal (CP5) into direct current power. Additionally, the second voltage regulator 240 may receive the rectified direct current power from the insulation-type SMPS 235 and may supply voltages to the controller 635, and the controller 635 may operate based on the voltages received from the second voltage regulator 240.

In the example of FIG. 9, the insulation-type SMPS 235 and the photocoupler 260 are required because a metal touch sensor is provided inside the upper portion (630 in FIG. 6) of the handle.

An example case in which no insulation structure is required because a metal touch sensor is not provided inside the upper portion (630 in FIG. 6) of the handle is described with reference to FIG. 10.

The relay control structure in FIG. 10 and the relay control structure in FIG. 9 are the same except some configurations and features. Accordingly, differences between the relay control structures of FIGS. 9 and 10 are described.

Referring to FIG. 10, the supporter 100, as illustrated in FIG. 9, may include a first power module (PM1), a relay (RL), the buck converter 115, and the first voltage regulator 120.

When the first and second power modules (PM1, and PM2) are male-female coupled, the second connection terminal (CP2) of the first power module (PM1) may be electrically connected with the sixth connection terminal (CP6) of the second power module (PM2).

Unlike the relay control structure in FIG. 9, the relay control structure in FIG. 10 includes no photocoupler. Accordingly, the switchover operation of the relay (RL) may be directly controlled by turning on or turning off a switch 250'.

Unlike the pot main body 200 in FIG. 9, the pot main body 200 in FIG. 10 may include a second power module (PM2), the heater 220, an SMPS 235' (switched-mode power supply), the second voltage regulator 240, and a switch 250'.

The pot main body 200 in FIG. 10 does not include a photocoupler and does not necessarily include an insulation-type SMPS. Specifically, the SMPS 235', like the insulation-type SMPS (235 in FIG. 9), may be connected to the fifth connection terminal (CP5) and may rectify electric power supplied to the second power module (PM2). Additionally, the SMPS 235' may receive alternating current power from the second power module (PM2), may rectify the received alternating current power into direct current power and may transmit the direct current power to the second voltage regulator 240.

The SMPS 235' may have any one of an insulation property and a non-insulation property. Accordingly, the second voltage regulator 240 may also be connected to the first ground (G1), or may also be connected to another ground (not illustrated) not to the first ground (G1).

A metal touch sensor is not provided inside the upper portion (630 in FIG. 6) of the above-described handle. Accordingly, the SMPS 235' does not need to serve as an insulation structure.

The second voltage regulator 240 may control magnitude of a voltage of electric power rectified by the SMPS 235' to a predetermined second voltage (V2).

Operations of the switch 250' may be controlled by the controller 635, and, unlike the switch in FIG. 9, may be connected to the first ground (G1). Specifically, a collector (C) of the switch 250' may be connected to the six connection terminal (CP6), and an emitter of the switch 250' may be connected to the first ground (G1). Additionally, the switch 250' may be turned on or turned off based on a switch-control signal (SC) received from the controller 635, and the switchover operation of the relay (RL) may be controlled based on the turning-on or turning-off of the switch 250'.

When the switch 250' is turned on, the relay (RL) is switched over, and the power supply 300 and the third connection terminal (CP3) are connected, and when the switch 250' is turned off, the relay (RL) may be switched over, and the connection between the power supply 300 and the third connection terminal (CP3) may be blocked.

That is, the relay control structure in FIG. 10 includes no photocoupler. Accordingly, the switchover operation of the relay (RL) may be directly controlled based on the operations of the switch 250'.

The controller 635, as in FIG. 9, may receive electric power from the pot main body 200 to operate. That is, the controller 635 may be provided inside the upper portion (630 in FIG. 6) of the above-described handle, may operate based on voltages received from the second voltage regulator 240, and may control the operations of the switch 250'.

More specifically, when receiving a product-driving signal from the input part (not illustrated), the controller 635 may supply a switch-control signal (SC) to a base (B) of the switch 250' based on the received product-driving signal. When the switch 250' is turned on by the switch-control signal (SC), the relay (RL) may be switched over, and the power supply 300 and the third connection terminal (CP3) may be connected.

When receiving a product-driving-stop signal from the input part, the controller 635 may provide a switch-control signal (SC) to the base (B) of the switch 250' based on the received product-driving-stop signal. When the switch 250' is turned off by the switch-control signal (SC), the relay (RL) may be switched over, and the connection between the power supply 300 and the third connection terminal (CP3) may be blocked.

The input part may be implemented at the above-described handle (600 in FIG. 5) or the above-described handle coupler (570 in FIG. 5) and the like in the form of a button, or in the form of a display to which a touch screen is applied, but not be limited. That is, the input part may also be implemented on an outer surface of the pot main body 200 or the supporter 100. In FIG. 10, the input part implemented at the handle (600 in FIG. 5) or the handle coupler (570 in FIG. 5) and the like is provided as an example for convenience of description.

Unlike the relay control structure in FIG. 9, the relay control structure in FIG. 10 includes the above-described SMPS 235', the second voltage regulator 240, and the switch 250' mounted on a second printed circuit board (PCB2) provided in the pot main body 200 (i.e., an inner lower portion of the pot main body 200), but not be limited.

That is, the above-described SMPS 235', the second voltage regulator 240, and the switch 250' may be distributed and mounted respectively on an additional printed circuit board. In FIG. 10, the above-described SMPS 235', the second voltage regulator 240, and the switch 250' mounted on the second printed circuit board (PCB2) are provided as an example.

Specifically, when the controller 635 turns on the switch 250' in a state in which the first power module (PM1) and the second power module (PM2) are electrically connected, the relay (RL) may be switched over, and the power supply 300 and the third connection terminal (CP3) may be connected.

That is, when the switch 250' is turned on, electric currents may flow along a path (i.e., a path to which the predetermined first voltage (V1) is supplied) to the relay (RL), the second connection terminal (CP2), the sixth connection terminal (CP6), the switch 250', and the first ground (G1), and, accordingly, the relay (RL) may be switched over in a direction in which the power supply 300 and the third connection terminal (CP3) are connected.

Additionally, the relay (RL) is switched over as described above. Accordingly, the power supply 300 and the third connection terminal (CP3) may be connected. Electric power of the power supply 300 may be supplied to the heater 220, and, accordingly, the heater 220 may be driven.

When the controller 635 turns off the switch 250' in a state in which the first power module (PM1) and the second power module (PM2) are electrically connected, the relay (RL) may be switched over, and the connection between the power supply 300 and the third connection terminal (CP3) may be blocked.

That is, when the switch 250' is turned off, electric currents may not flow along a path to the relay (RL), the second connection terminal (CP2), the sixth connection terminal (CP6), the switch 250', and the first ground (G1), and, accordingly, the relay (RL) may be switched over in a direction in which a connection between the power supply 300 and the third connection terminal (CP3) are blocked.

The relay (RL) may be switched over as described above. Accordingly, the connection between the power supply 300 and the third connection terminal (CP3) may be blocked. Electric power of the power supply 300 may not be supplied to the heater 220. Accordingly, the heater 220 may not be driven.

When the first power module (PM1) and the second power module (PM2) are electrically connected, the first voltage regulator 120 may supply alternating current power to the fifth connection terminal (CP5) through the first connection terminal (CP1), and the SMPS 235' may rectify the alternating current power supplied to the fifth connection terminal (CP5) into direct current power. Additionally, the second voltage regulator 240 may receive the rectified direct current power from the SMPS 235' and may supply voltages to the controller 635, and the controller 635 may operate based on the voltages received from the second voltage regulator 240.

As described above, in the example case of FIG. 10, no insulation-type SMPS and no photocoupler is required because a metal touch sensor is not provided inside the upper portion (630 in FIG. 6) of the handle.

In the electric pot 1000 according to the example embodiment, the relay part, as described above, is provided in the supporter, thereby improving a relay installation position. As a result, the possibility of damage done to the relay may be minimized. Additionally, in the electric pot 1000, the relay part may be provided in the supporter without a 6-terminal-type power module, thereby reducing a diameter of a product and satisfying a product standard.

The electric pot 1000 may control the relay without an additional communication means through a simple circuit configuration, thereby reducing manufacturing costs. Further, the electric pot 1000 may not invite deterioration of communication performance caused by heat given off by the heater or by a foreign substance because the electric pot does not require an additional communication means when the relay is controlled, thereby enhancing credibility of a product.

The present disclosure is directed to providing an electric pot having an improved relay installation position.

Additionally, the present disclosure is directed to providing an electric pot that may control a relay through a simple circuit configuration without an additional communication means.

An electric pot according to the present disclosure includes a supporter provided with a relay part, thereby improving a relay installation position.

Additionally, the electric pot according to the present disclosure includes a supporter that includes a first power module provided with a fourth connection terminal connected to a neural line of a power supply and that includes a first voltage regulator connected to a first ground, and a pot main body that includes a second power module provided with a seventh connection terminal electrically connected with the fourth connection terminal and connected to the first ground, thereby controlling the relay part through a simple circuit configuration without an additional communication means.

The electric pot may improve a relay installation position, and, as a result, may minimize the possibility of damage to a relay because a relay part is provided in a supporter. Additionally, according to the electric pot, the relay part may be provided in the supporter without a 6-terminal-type power module, thereby reducing a diameter of a product and satisfying a product standard.

Additionally, the electric pot may control the relay through a simple circuit configuration without an additional communication means, thereby reducing manufacturing costs. Further, the electric pot may not invite deterioration of communication performance caused by heat given off by a heater or by a foreign substance because the electric pot does not require an additional communication means when the relay is controlled, thereby enhancing credibility of a product.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric pot, comprising:
a supporter that includes a first power module provided at an upper end of the supporter and configured to receive electrical power from a power supply, the first power module includes first to fourth connection terminals;
a pot main body that is detachably coupled to the upper end of the supporter, and the pot main body includes:
a second power module including fifth to seventh connection terminals, and the second power module configured to receive electrical power from the first power module through the fifth connection terminal while being electrically connected with the first connection terminal, and
a heater to provide heat based on an electrical connection with the third and fourth connection terminals; and
a controller to receive electrical power from the pot main body,
wherein the supporter includes:
a relay circuit that selectively switches between a connection of the power supply to the third connection terminal and a disconnection of the power supply to the third connection terminal based on the second connection terminal being electrically connected with the sixth connection terminal,
a buck converter that receives alternating current power from the power supply and that converts magnitude of a voltage of the received alternating current power, and
a first voltage regulator that controls magnitude of a voltage from the buck converter to a predetermined first voltage, and
wherein the first voltage regulator and the seventh connection terminal are commonly connected to a first ground.

2. The electric pot of claim 1, wherein the pot main body includes:
an insulation-type switched mode power supply (SMPS) that is connected to the fifth connection terminal and that rectifies electrical power supplied to the second power module,
a second voltage regulator that controls magnitude of a voltage of electrical power rectified by the insulation-type SMPS to a predetermined second voltage, and the second voltage regulator is connected to a second ground that is different from the first ground,
a switch that selectively changes between a first state and a second state based on a signal from the controller, and a part of the switch is connected to the second ground, and a photocoupler that controls an electrical connection between the sixth connection terminal and the first ground based on the first state of the switch.

3. The electric pot of claim 2, wherein when the controller controls the switch to be in the first state and the first power module is electrically connected to the second power module, the photocoupler is to electrically connect the sixth connection terminal and the first ground, and wherein when the controller controls the switch to be in the second state and the first power module is electrically connected to the second power module, the photocoupler is to prevent an electrical connection between the sixth connection terminal and the first ground.

4. The electric pot of claim 3, wherein when the photocoupler is to electrically connect the sixth connection terminal and the first ground, the relay circuit is to provide the connection of the power supply and the third connection terminal, and when the photocoupler is to prevent the electrical connection between the sixth connection terminal and the first ground, the relay circuit is to provide the disconnection of the power supply to the third connection terminal.

5. The electric pot of claim 2, wherein the photocoupler includes a light-emitting element connected to the switch, and a light-receiving element connected between the sixth connection terminal and the first ground.

6. The electric pot of claim 5, wherein the light-emitting element and the light-receiving element are electrically insulated from each other, the light-emitting element is to transmit a light-receiving-element-control signal to the light-receiving element based on the first state of the switch, and the light-receiving-element-control signal is to be transmitted from the light-emitting element to the light-receiving element using light as a medium.

7. The electric pot of claim 2, wherein the switch includes a collector and emitter, the collector is connected to the photocoupler, and the emitter is connected to the second ground.

8. The electric pot of claim 2, wherein when the first power module is electrically connected to the second power module, the first voltage regulator is to provide alternating current power to the fifth connection terminal through the first connection terminal, and the insulation-type SMPS is to rectify the alternating current power provided to the fifth connection terminal into direct current power.

9. The electric pot of claim 2, wherein the second voltage regulator is to provide a voltage to the controller, and the controller is to operate based on the voltage received from the second voltage regulator.

10. The electric pot of claim 2, wherein a voltage value of the predetermined first voltage is greater than a voltage value of the predetermined second voltage.

11. The electric pot of claim 2, wherein the relay circuit, the buck converter, and the first voltage regulator are mounted on a first printed circuit board provided on the supporter, and the insulation-type SMPS, the second voltage regulator, the switch and the photocoupler are mounted on a second printed circuit board provided on the pot main body.

12. The electric pot of claim 1, wherein the pot main body includes:

a switched mode power supply (SMPS) that is connected to the fifth connection terminal and that rectifies electrical power provided to the second power module, a second voltage regulator that controls magnitude of a voltage of electrical power rectified by the SMPS to a predetermined second voltage, and a switch to selectively change between a first state and a second state, the switch in the first state is to connect the sixth connection terminal and the first ground based on a signal from the controller, wherein the second voltage regulator is to provide a voltage to the controller, the controller is to operate based on a voltage received from the second voltage regulator, and the controller is to control the switch.

13. The electric pot of claim 12, wherein when the controller controls the switch to be in the first state and the first power module is electrically connected to the second power module, the relay circuit is to provide the connection of the power supply to the third connection terminal, and when the controller controls the switch to be in the second state and the first power module is electrically connected to the second power module, the relay circuit is to provide the disconnection of the power supply to the third connection terminal.

14. The electric pot of claim 12, wherein the switch includes a collector and an emitter, the collector is connected to the sixth connection terminal, and the emitter is connected to the first ground.

15. The electric pot of claim 12, wherein when the first power module is electrically connected to the second power module, the first voltage regulator is to provide alternating current power to the fifth connection terminal through the first connection terminal, and the SMPS is to rectify the alternating current power provided to the fifth connection terminal into direct current power.

16. The electric pot of claim 12, wherein a voltage value of the predetermined first voltage is greater than a voltage value of the predetermined second voltage.

17. The electric pot of claim 12, wherein the relay circuit, the buck converter, and the first voltage regulator are mounted on a first printed circuit board provided on the supporter, and the SMPS, the second voltage regulator, and the switch are mounted on a second printed circuit board provided on the pot main body.

18. The electric pot of claim 1, wherein when the first, second and fourth connection terminals are electrically connected respectively to the fifth to seventh connection terminals, the third and fourth connection terminals are electrically connected to the heater.

19. The electric pot of claim 1, wherein the first power module is to protrude upwards from the upper end of the supporter and is male-female coupled to the second power module, and the supporter and the pot main body are coupled based on the male-female coupling between the first power module and the second power module.

20. The electric pot of claim 1, wherein a neutral line of the power supply is connected to the fourth connection terminal, a live line of the power supply is connected to the third connection terminal, and the relay circuit is to provide the connection on the live line.

* * * * *